(12) United States Patent
Kitakata

(10) Patent No.: US 10,399,520 B2
(45) Date of Patent: Sep. 3, 2019

(54) VEHICLE BODY STRUCTURE

(71) Applicant: TOYOTA JIDOSHA KABUSHIKI KAISHA, Toyota-shi, Aichi-ken (JP)

(72) Inventor: Shintaro Kitakata, Nisshin (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/810,509

(22) Filed: Nov. 13, 2017

(65) Prior Publication Data

US 2018/0162302 A1 Jun. 14, 2018

(30) Foreign Application Priority Data

Dec. 9, 2016 (JP) .................................. 2016-239804

(51) Int. Cl.
*B60R 19/18* (2006.01)

(52) U.S. Cl.
CPC ........ *B60R 19/18* (2013.01); *B60R 2019/186* (2013.01)

(58) Field of Classification Search
CPC ............ B60R 19/18; B60R 2019/1813; B60R 19/023; B60R 2019/1826; B60R 19/24; B60R 2019/182; B60R 19/34
USPC ... 293/102, 117, 120, 132, 155, 4, 121, 115; 296/187.09, 136.11, 181.2, 187.03, 84.1, 296/70, 209
See application file for complete search history.

(56) References Cited

U.S. PATENT DOCUMENTS

| | | | |
|---|---|---|---|
| 3,877,741 A * | 4/1975 | Wilfert .................... | B60R 19/04 293/120 |
| 9,205,790 B2 * | 12/2015 | Yabu ....................... | B60R 19/03 |
| 9,598,033 B1 * | 3/2017 | Berger .................... | B60R 19/03 |
| 2014/0367981 A1 * | 12/2014 | Zaluzec ................. | B60R 19/18 293/121 |
| 2016/0144812 A1 * | 5/2016 | Kaneko .................. | B60R 19/18 293/102 |
| 2016/0325701 A1 * | 11/2016 | Yabu ....................... | B60R 19/03 |

FOREIGN PATENT DOCUMENTS

| | | | |
|---|---|---|---|
| JP | 2013-159153 A | | 8/2013 |
| JP | 2015-160524 A | | 9/2015 |
| JP | 2016-097794 A | | 5/2016 |
| JP | 2017100375 A | * | 6/2017 |

* cited by examiner

*Primary Examiner* — D Glenn Dayoan
*Assistant Examiner* — Sunsurraye Westbrook
(74) *Attorney, Agent, or Firm* — Oliff PLC

(57) ABSTRACT

A vehicle body structure includes a reinforcing member formed of a fiber reinforced resin and having a plate shape or a sheet shape and a metallic vehicle framework member. The vehicle framework member includes a rear wall portion and a reinforcing portion, one end face of the reinforcing member in a thickness direction of the reinforcing member being bonded to the rear wall portion and the reinforcing portion being disposed on the rear wall portion and protruding along a vertical direction from the rear wall portion.

12 Claims, 8 Drawing Sheets

VEHICLE BODY STRUCTURE

INCORPORATION BY REFERENCE

The disclosure of Japanese Patent Application No. 2016-239804 filed on Dec. 9, 2016 including the specification, drawings and abstract is incorporated herein by reference in its entirety.

BACKGROUND

1. Technical Field

The present disclosure relates to a vehicle body structure.

2. Description of Related Art

Japanese Unexamined Patent Application Publication No. 2015-160524 (JP 2015-160524 A) discloses a B pillar (center pillar) that constitutes a part of a side door opening portion disposed in a side portion of a vehicle. The B pillar is formed by bonding between an inner panel and an outer panel in a hat shape in section. A CFRP-based reinforcing material that has a sheet shape is bonded to the inner panel in the up-down direction of the vehicle. As a result, the flexural capacity of the entire B pillar including the reinforcing member is improved.

SUMMARY

Although a reduction in the plate thickness of a vehicle framework member is conceivable for the purpose of vehicle weight reduction, a reduced plate thickness results in a decline in flexural rigidity, and then wrinkles and unevenness may occur in a wall portion of the vehicle framework member once the vehicle framework member is bent. Accordingly, in a case where the reinforcing member is bonded to the vehicle framework member as in the configuration that is disclosed in JP 2015-160524 A, the adhesion of the reinforcing member declines if the wrinkles and unevenness occur in the wall portion of the vehicle framework member, and thus biased bonding occurs between the reinforcing member and the vehicle framework member and the reinforcing member does not work effectively. Then, the flexural capacity of the entire vehicle framework member including the reinforcing member may be reduced. Accordingly, the related art has room for improvement in this regard.

The disclosure provides a vehicle body structure with which the entire flexural capacity of a vehicle framework member that includes a plate- or sheet-shaped reinforcing member, is bent, and is reinforced by the reinforcing member can be improved.

An aspect relates to a vehicle body structure including a reinforcing member formed of a fiber reinforced resin and having a plate shape or a sheet shape and a metallic vehicle framework member. The vehicle framework member includes a rear wall portion and a reinforcing portion, one end face of the reinforcing member in a thickness direction of the reinforcing member being bonded to the rear wall portion and the reinforcing portion being disposed on the rear wall portion and protruding along a vertical direction from the rear wall portion.

According to the aspect, the plate-shaped or sheet-shaped reinforcing member formed of the fiber reinforced resin is bonded to the rear wall portion of the metallic vehicle framework member. In addition, the reinforcing portion protruding along the vertical direction from the rear wall portion is formed on the rear wall portion of the vehicle framework member. By the reinforcing portion being disposed, the flexural rigidity of the rear wall portion of the vehicle framework member is improved, and thus the occurrence of wrinkles and unevenness in the rear wall portion can be suppressed when the vehicle framework member is bent. Accordingly, the adhesion of the reinforcing member with respect to the rear wall portion of the vehicle framework member does not decline, and thus the reinforcing member is substantially uniformly bonded to the vehicle framework member. As a result, the reinforcing member works effectively, and the flexural capacity of the vehicle framework member including the reinforcing member can be improved.

In the vehicle body structure according to the aspect, the rear wall portion of the vehicle framework member may have a bonded surface facing and bonded to the end face of the reinforcing member in the thickness direction of the reinforcing member, and the reinforcing portion may be disposed on the bonded surface.

In the vehicle body structure according to the aspect, a plurality of the reinforcing portions may be disposed on the bonded surface of the rear wall portion of the reinforcing portion, and the reinforcing portions may have a constant amount of protrusion from the bonded surface (in the present specification, the meaning of "constant" includes "substantially constant"), and an adhesive may be interposed between the reinforcing portions.

According to the aspect, the reinforcing portions are disposed on the bonded surface of the vehicle framework member and the reinforcing portions have the substantially constant amount of protrusion from the bonded surface. In addition, the adhesive is interposed between the reinforcing portions. In other words, the adhesive layers that are between the bonded surface and the reinforcing member have a substantially constant thickness, and thus the adhesive force between the bonded surface and the reinforcing member can be substantially constant.

In the vehicle body structure according to the aspect, the vehicle framework member may have an end portion reinforcing portion which is disposed on the bond surface of the vehicle framework member and which extends in the thickness direction of the reinforcing member, the end portion reinforcing portion facing at least a part of an end face of the reinforcing member in a direction intersecting the thickness direction of the reinforcing member, and the adhesive may be interposed between the end portion reinforcing portion and the reinforcing member.

According to the aspect, the end portion the vehicle framework member may have an end portion reinforcing portion which is disposed on the bond surface of the vehicle framework member and which extends in the thickness direction of the reinforcing member, the end portion reinforcing portion facing at least a part of an end face of the reinforcing member in a direction intersecting the thickness direction of the reinforcing member, and the adhesive may be interposed between the end portion reinforcing portion and the reinforcing member. Accordingly, peeling of the reinforcing member from the end face of the vehicle framework member starting in the direction intersecting the thickness direction of the reinforcing member can be suppressed, the adhesive area of the reinforcing member with respect to the vehicle framework member can be increased, and the adhesive force can be improved.

In the vehicle body structure according to the aspect, the rear wall portion of the vehicle framework member may have a first surface and a second surface, the first surface may be on a side opposite to the second surface facing and bonded to the end face of the reinforcing member in the thickness direction of the reinforcing member, and the reinforcing portion may be disposed on the first surface of the rear wall portion.

In the vehicle body structure according to the aspect, the reinforcing portion may be a protruding portion protruding along the vertical direction from the rear wall portion.

In the vehicle body structure according to the aspect, the vehicle framework member may include a front wall portion, an upper wall portion extending toward a rear of a vehicle from an upper end side of the front wall portion, and a lower wall portion extending toward the rear of the vehicle from a lower end side of the front wall portion, the rear wall portion may connect a rear end side part of the upper wall portion and a rear end side part of the lower wall portion to each other in an up-down direction of the vehicle, and the rear wall portion may have the bonded surface.

In the vehicle body structure according to the aspect, the vehicle framework member may further include a middle wall portion extending in a front-rear direction of the vehicle and connecting an upper section of the front wall portion and an upper section of the rear wall portion to each other. The upper section of the front wall portion may be above a center of the front wall portion in the up-down direction of the vehicle, and the upper section of the rear wall portion may be above a center of the rear wall portion in the up-down direction of the vehicle.

With the vehicle body structure according to the aspect, an excellent effect is achieved as the flexural capacity of the entire vehicle framework member that includes a plate- or sheet-shaped reinforcing material, is bent, and is reinforced by the reinforcing member can be improved and/or stabilized.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
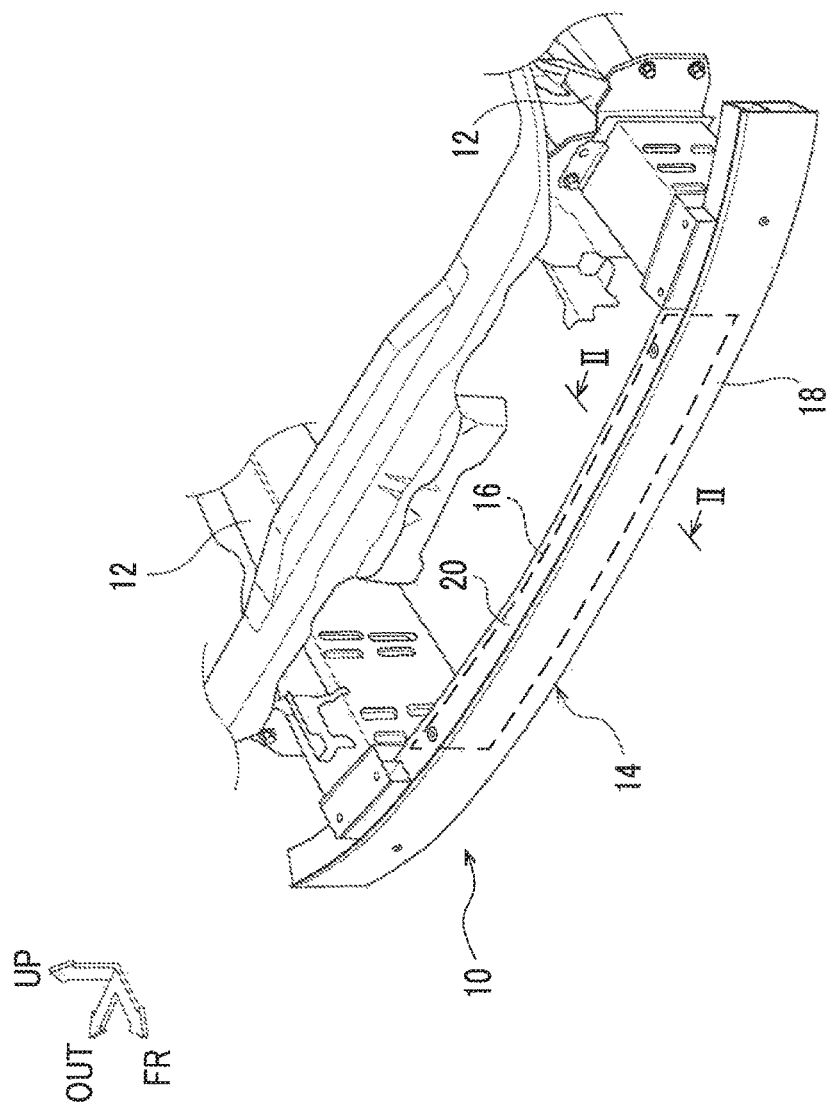
FIG. 1 is a perspective view illustrating a state where a front bumper reinforcement having a vehicle body structure according to a first embodiment is seen from the front side of a vehicle toward the rear side of the vehicle.

Hereinafter, a vehicle body structure according to an embodiment will be described with reference to FIGS. 1 to 8B. The arrows FR, OUT, and UP that are illustrated in the drawings represent the front side of a vehicle in its front-rear direction, the outside in the width direction of the vehicle, and the upper side in the up-down direction of the vehicle, respectively.

As illustrated in FIG. 1, a front bumper reinforcement (hereinafter, referred to as a "bumper R/F") 14 as a vehicle framework member and a reinforcing member 16 constitute a vehicle body structure 10 disposed in the front portion of the vehicle. The bumper R/F 14 is disposed on the front sides of a pair of front side members 12 in the width direction of the vehicle.

Figure 2:
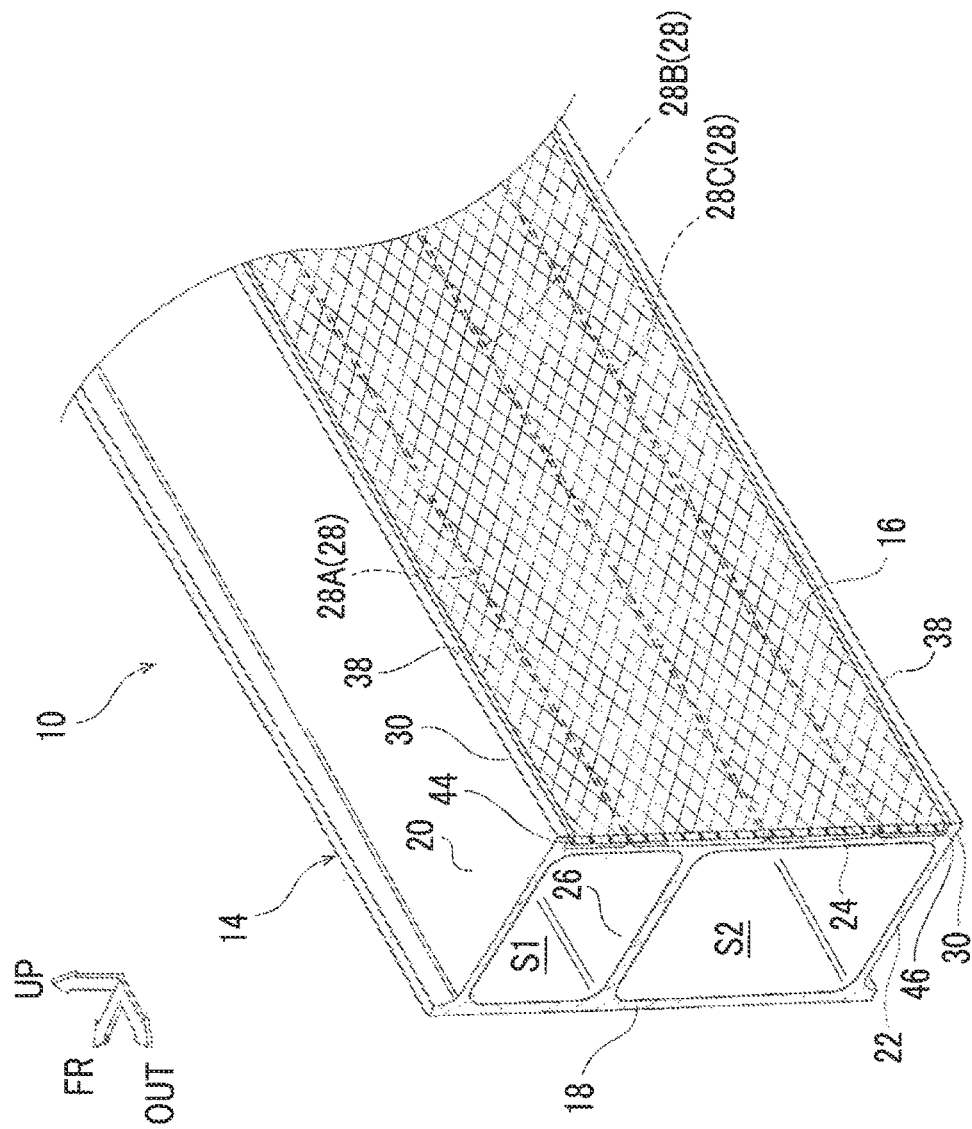
FIG. 2 is a cross-sectional perspective view illustrating a state where the front bumper reinforcement is cut along line II-II of FIG. 1.

The bumper R/F 14 is an extruded member manufactured by extrusion molding or the like, and the bumper R/F 14 according to the present embodiment has a substantially ladder-shaped cross section in side view of the vehicle as illustrated in FIG. 2. Specifically, the bumper R/F 14 is provided with a rectangular front wall portion 18, an upper wall portion 20, and a lower wall portion 22. The front wall portion 18 extends in the front-rear direction of the vehicle as its thickness direction and in the width direction of the vehicle as its longitudinal direction. The upper wall portion 20 extends rearward from the upper end side part of the front wall portion 18. The lower wall portion 22 extends rearward from the lower end side part of the front wall portion 18. The bumper R/F 14 is also provided with a rear wall portion 24 as a bonded surface. The rear wall portion 24 connects the rear end side part of the upper wall portion 20 and the rear end side part of the lower wall portion 22 to each other in the up-down direction. The bumper R/F 14 has the form of a rectangular closed sectional structure that has the up-down direction of the vehicle as its longitudinal direction in side view of the vehicle by having the front wall portion 18, the upper wall portion 20, the lower wall portion 22, and the rear wall portion 24. Although the bumper R/F 14 according to the present embodiment is a closed sectional structure, the disclosure is not limited thereto. The bumper R/F 14 may be an open sectional structure as well.

The bumper R/F 14 is also provided with a middle wall portion 26. The middle wall portion 26 connects the upper side of the intermediate portion of the front wall portion 18 in the up-down direction of the vehicle and the upper side of the intermediate portion of the rear wall portion 24 in the up-down direction of the vehicle to each other in the front-rear direction. The space that is closed by the front wall portion 18, the upper wall portion 20, the lower wall portion 22, and the rear wall portion 24 is divided in the up-down direction of the vehicle by the middle wall portion 26. A closed space S1 on the upper side of the vehicle is smaller in size than a closed space S2 on the lower side of the vehicle.

Figure 3:
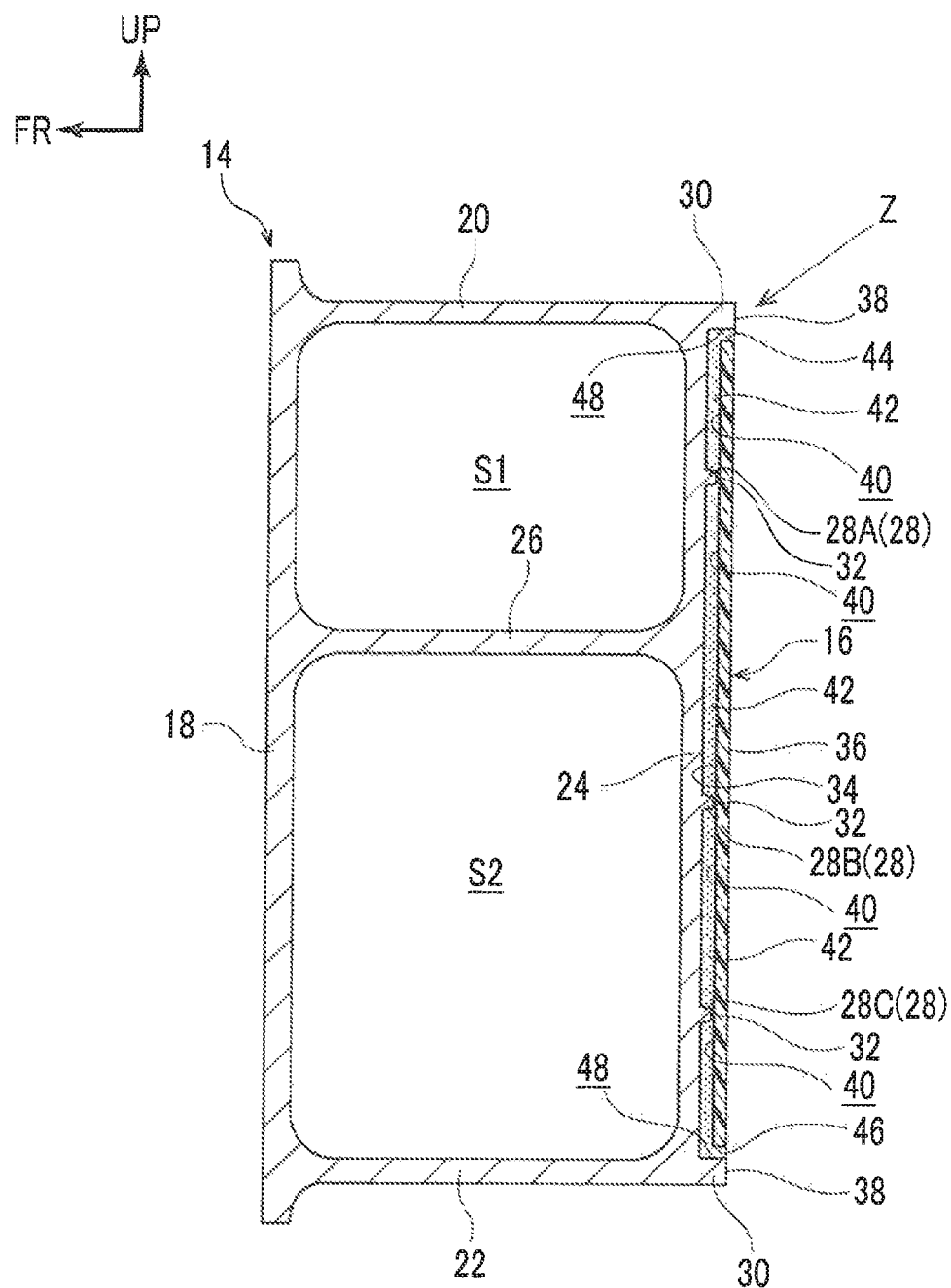
FIG. 3 is an enlarged cross-sectional view illustrating the state where the front bumper reinforcement is cut along line II-II of FIG. 1.
Figure 4:
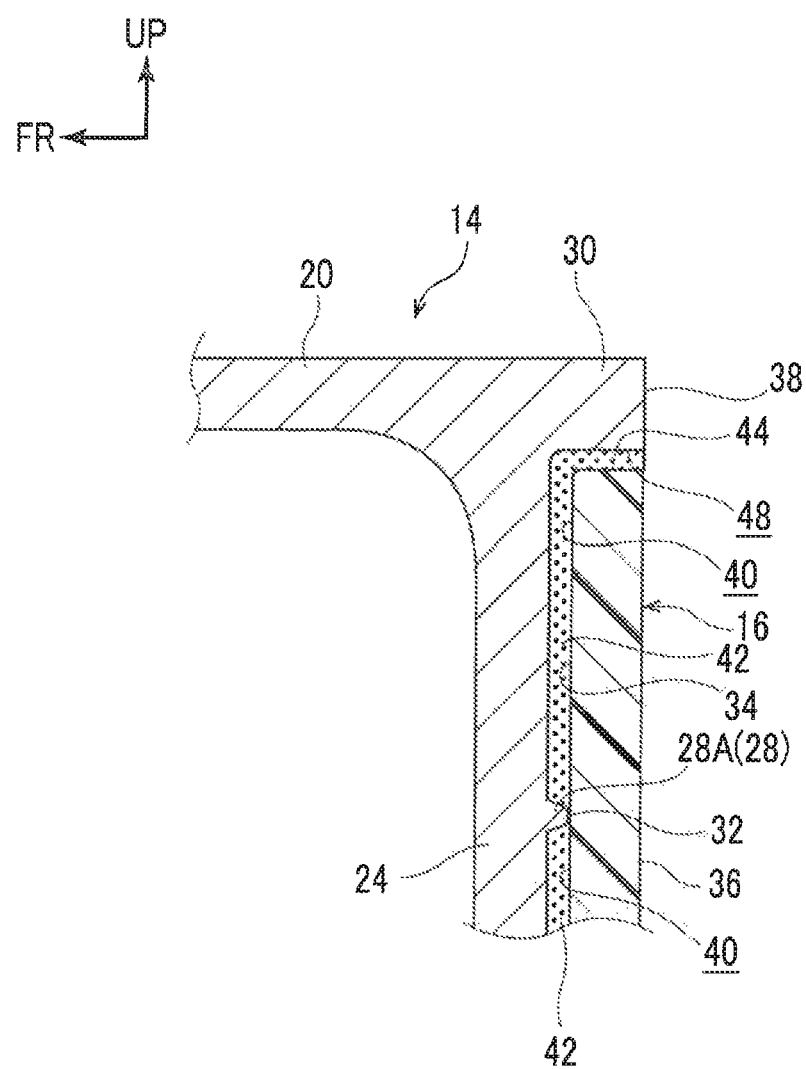
FIG. 4 is an enlarged sectional view of the Z part that is illustrated in FIG. 3.

A plurality of (three in the present embodiment) reinforcing portions 28 and end portion reinforcing portions 30 are formed in the rear wall portion 24 of the bumper R/F 14. Each of the three reinforcing portions 28 extends along the longitudinal direction of the bumper R/F 14. As illustrated in FIG. 3, each of the three reinforcing portions 28 protrudes to the rear side of the vehicle from the rear wall portion 24 along the direction that is perpendicular to the surface of the rear wall portion 24 and in the shape of a projection in side view of the vehicle. The amounts by which the reinforcing portions 28 protrude are set such that the amounts are substantially equal to one another.

The reinforcing portions 28 are separated from one another in the up-down direction of the vehicle. Specifically, the reinforcing portions 28 are disposed inside the end portion reinforcing portions 30 in the up-down direction of the vehicle with the two end portion reinforcing portions 30 formed in respective end portions of the rear wall portion 24 in the up-down direction of the vehicle, and a first reinforcing portion 28A is formed substantially in the middle of the part of the rear wall portion 24 in the up-down direction of the vehicle that corresponds to the closed space S1. A second reinforcing portion 28B and a third reinforcing portion 28C are formed at the part of the rear wall portion 24 that corresponds to the closed space S2. The dimension in the up-down direction of the vehicle from the second reinforcing portion 28B to the middle wail portion 26 and the dimension in the up-down direction of the vehicle from the third reinforcing portion 28C to the end portion reinforcing portion 30 in the lower end portion of the rear wall portion 24 are set such that the dimensions are substantially equal to each other. In other words, by the reinforcing portions 28 being disposed, the number of ridgelines bearing a bending load increases at the parts of the rear wall portion 24 where the stress in the direction that is perpendicular to the surface decreases (specifically, between the upper wall portion 20 and the middle wall portion 26 and between the middle wall portion 26 and the lower wall portion 22). Accordingly, the effective width of the rear wall portion 24 increases and the flexural rigidity of the rear wall portion 24 is improved.

The end portion reinforcing portions 30 protrude to the rear side of the vehicle from the rear wall portion 24 along the direction that is perpendicular to the surface of the rear wall portion 24. The amounts by which the end portion reinforcing portions 30 protrude are set such that the amounts are substantially equal to each other and the amounts are larger than the amounts by which the reinforcing portions 28 protrude. Specifically, the end portion reinforcing portions 30 protrude more to the rear side of the vehicle than the reinforcing portions 28 and the difference between the amounts by which the end portion reinforcing portions 30 and the reinforcing portions 28 protrude is equal to the dimension of the plate thickness of the reinforcing member 16 (described later) from top wall portions 32 of the reinforcing portions 28. The plate thickness of the end portion reinforcing portions 30 (dimension of the end portion reinforcing portions 30 in the up-down direction of the vehicle) is set such that the plate thickness is substantially equal to those of the upper wall portion 20 and the lower wall portion 22.

The reinforcing member 16 is formed of a fiber reinforced resin (such as CFRP and GFRP). The reinforcing member 16 has the shape of a rectangular plate and extends in the front-rear direction of the vehicle as its thickness direction and in the width direction of the vehicle as its longitudinal direction. In the present embodiment, the fiber that is inside the reinforcing member 16 (such as a carbon fiber and a glass fiber, not illustrated) has the same direction as the longitudinal direction of the reinforcing member 16 (width direction of the vehicle). The shape of the reinforcing member 16 is not limited to the plate shape. The reinforcing member 16 may have the shape of a sheet as well.

A vehicle front side surface 34 is one of the end faces of the reinforcing member 16 in the thickness direction of the reinforcing member 16. The vehicle front side surface 34 abuts against the top wall portions 32 of the reinforcing portions 28. As a result, a vehicle rear side surface 36 of the reinforcing member 16 is substantially flush with vehicle rear side surfaces 38 of the end portion reinforcing portions 30.

A plurality of first gaps 40 is formed between the vehicle front side surface 34 and the rear wall portion 24 of the bumper R/F 14. The first gaps 40 have a substantially constant dimension in the direction that is perpendicular to the surface of the rear wall portion 24. An adhesive 42 is interposed in the first gaps 40. An upper end face 44 and a lower end portion 46 of the reinforcing member 16 are disposed to face the end portion reinforcing portions 30 of the bumper R/F 14. The upper end face 44 and the lower end portion 46 are the end faces of the reinforcing member 16 in the direction that intersects the thickness direction of the reinforcing member 16. A second gap 48 is formed between the upper end face 44 and the upper end portion reinforcing portion 30 and another second gap 48 is formed between the lower end portion 46 and the lower end portion reinforcing portion 30 (refer to FIG. 4). The second gaps 48 are continuous to the first gaps 40 on the upper and lower sides of the vehicle, respectively. The second gaps 48 have a substantially constant dimension in the up-down. direction of the vehicle. The adhesive 42 is interposed in the second gaps 48 to be continuous to that in the first gaps 40. In other words, the adhesive 42 is interposed between the reinforcing portions 28 (in the first gap 40 between the first reinforcing portion 28A and the second reinforcing portion 28B and in the first gap 40 between the second reinforcing portion 28B and the third reinforcing portion 28C) and the adhesive 42 is also interposed between the end portion reinforcing portions 30 and the reinforcing member 16.

Action and Effect of First Embodiment

Figure 8A:
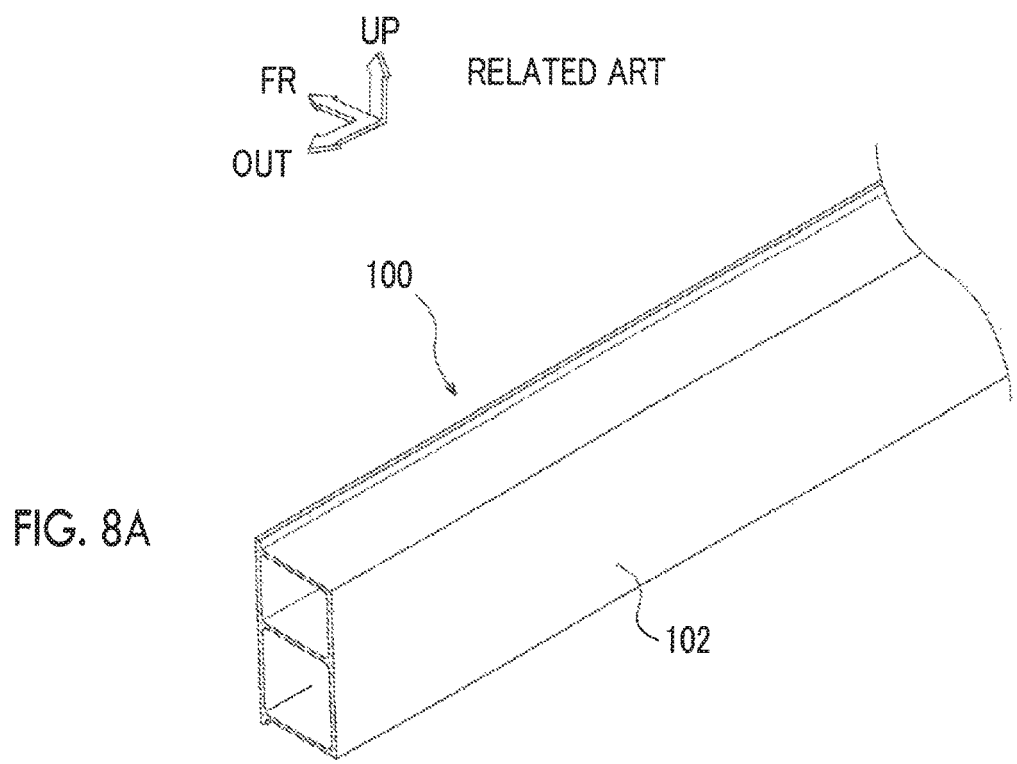
FIG. 8A is a sectional perspective view illustrating a state where a front bumper reinforcement according to a comparative example is cut by the plane orthogonal to the longitudinal direction.
Figure 8B:
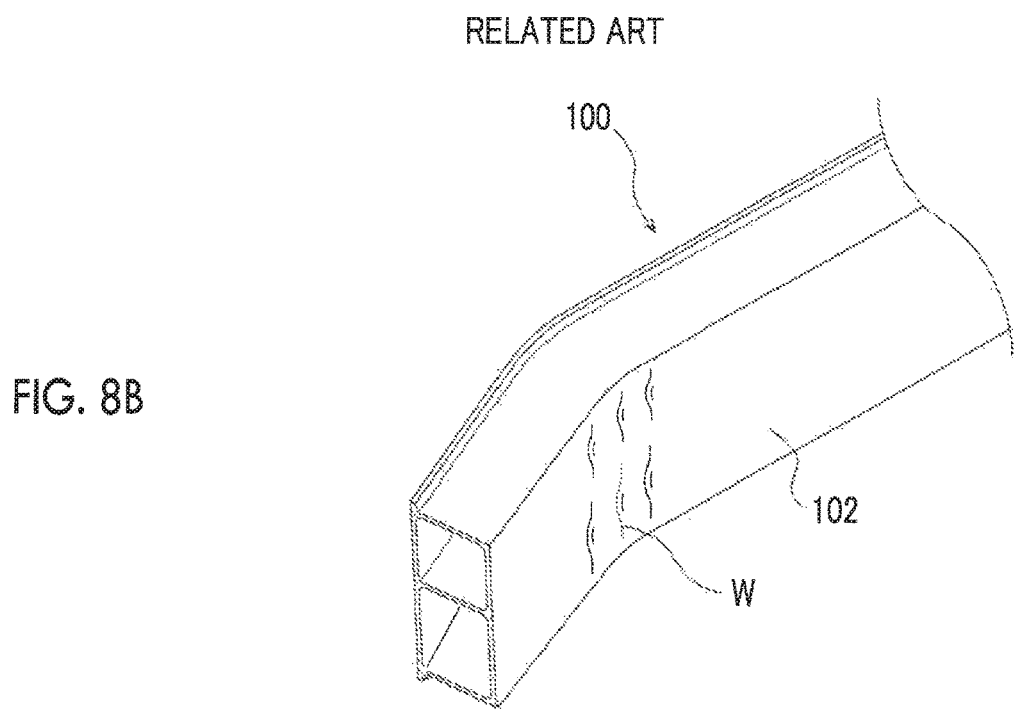
FIG. 8B is a sectional perspective view illustrating a state where bending is performed in the direction orthogonal to the longitudinal direction with respect to FIG. 8A.

The action and effect of the present embodiment will be described below along with the comparative example that is illustrated in FIGS. 8A and 8B. The same reference numerals will be used to refer to the same components as in the present embodiment, and description thereof will be omitted.

A reduction in the plate thickness of a rear wall portion 102 of a bumper R/F 100 as illustrated in FIG. 8A is conceivable for the purpose of vehicle weight reduction. In this case, a tensile load is applied to the rear wall portion 102 in the width direction of the vehicle during a head-on collision of the vehicle because the bumper R/F 100 is bent and projects to the rear side of the vehicle during the head-on collision of the vehicle. Accordingly, the flexural capacity of the rear wall portion 102 needs to be improved, and the flexural capacity of the rear wall portion 102 reduced in plate thickness can be improved by the reinforcing member 16 (refer to FIG. 3) being attached to the rear wall portion 102.

In the case of the comparative example, however, the reduced plate thickness of the rear wall portion 102 leads to a decline in the flexural rigidity of the rear wall portion 102, and thus wrinkles W or the like may occur in the rear wall portion 102 of the bumper R/F 100 as illustrated in FIG. 8B once the bumper R/F 100 is bent to fit into the design of the vehicle. Accordingly, the adhesion of the reinforcing member 16 with respect to the rear wall portion 102 declines, and thus biased bonding occurs between the reinforcing member 16 and the rear wall portion 102 and the reinforcing member 16 does not work effectively. Then, the flexural capacity of the rear wall portion 102 including the reinforcing member 16 may not be improved.

In the present embodiment, in contrast, the plate- or sheet-shaped reinforcing member 16 that is formed of a fiber reinforced resin is bonded to the rear wall portion 24 of the bumper R/F 14 that is formed of a metal as illustrated in FIG. 2. In addition, the reinforcing portions 28 protruding along the direction that is perpendicular to the surface of the rear wall portion 24 are formed in the rear wall portion 24 of the bumper R/F 14. By the reinforcing portions 28 being disposed, the flexural rigidity of the rear wall portion 24 of the bumper R/F 14 is improved in the direction that is perpendicular to the surface, and thus the rear wall portion 24 can be improved in terms of surface precision and the occurrence of wrinkles and unevenness in the rear wall portion 24 can be suppressed when the bumper R/F 14 is bent in the front-rear direction of the vehicle. Accordingly, the adhesion of the reinforcing member 16 with respect to the rear wall portion 24 of the bumper R/F 14 does not decline, and thus the reinforcing member 16 is substantially uniformly bonded to the bumper R/F 14. As a result, the reinforcing member 16 works effectively, and the flexural capacity of the bumper R/F 14 including the reinforcing member 16 can be improved. Accordingly, the flexural capacity of the entire bumper R/F 14 that includes the plate- or sheet-shaped reinforcing member 16, is bent, and is reinforced by the reinforcing member 16 can be improved.

By the flexural rigidity of the rear wall portion 24 of the bumper R/F 14 being improved, sectional deformation of the bumper R/F 14 is suppressed when a collision load is input to the bumper R/F 14 during the collision of the vehicle. Accordingly, the collision load can be transmitted to the front side members 12 in a more reliable manner.

The reinforcing portions 28 are disposed in the rear wall portion 24 of the bumper R/F 14, and the reinforcing portions 28 have a substantially constant amount of protrusion from the rear wall portion 24. The adhesive 42 is interposed between the reinforcing portions 28. In other words, the adhesive layers that are between the rear wall portion 24 and the reinforcing member 16 have a substantially constant thickness, and thus the adhesive force between the rear wall portion 24 and the reinforcing member 16 can be substantially constant. As a result, the flexural capacity of the entire bumper R/F 14 that includes the plate- or sheet-shaped reinforcing member 16, is bent, and is reinforced by the reinforcing member 16 can be stabilized. In addition, any excess or deficiency of the adhesive 42 can be prevented.

The end portion reinforcing portions 30 are formed on the rear wall portion 24 of the bumper R/F 14 and the end portion reinforcing portions 30 face at least a part of the upper end face 44 and at least a part of the lower end portion 46 of the reinforcing member 16 in a direction intersecting the thickness direction of the reinforcing member 16. In addition, the adhesive 42 is interposed between the end portion reinforcing portions 30 and the reinforcing member 16. Accordingly, peeling of the reinforcing member 16 from the bumper R/F 14 starting from the upper end face 44 and the lower end portion 46 can be suppressed, the adhesive area of the reinforcing member 16 with respect to the bumper R/F 14 can be increased, and the adhesive force can be improved. As a result, the flexural capacity of the entire bumper R/F 14 that includes the plate- or sheet-shaped reinforcing member 16, is bent, and is reinforced by the reinforcing member 16 can be improved.

Second Embodiment

Hereinafter, a vehicle body structure according to a second embodiment will be described. The same reference numerals will be used to refer to the components that are basically the same as in the first embodiment, and description thereof will be omitted.

The vehicle body structure according to the second embodiment has the same basic configuration as the vehicle body structure according to the first embodiment. The vehicle body structure according to the second embodiment is characterized by a plurality of reinforcing portions 50 protruding toward the front side of the vehicle.

Figure 5:
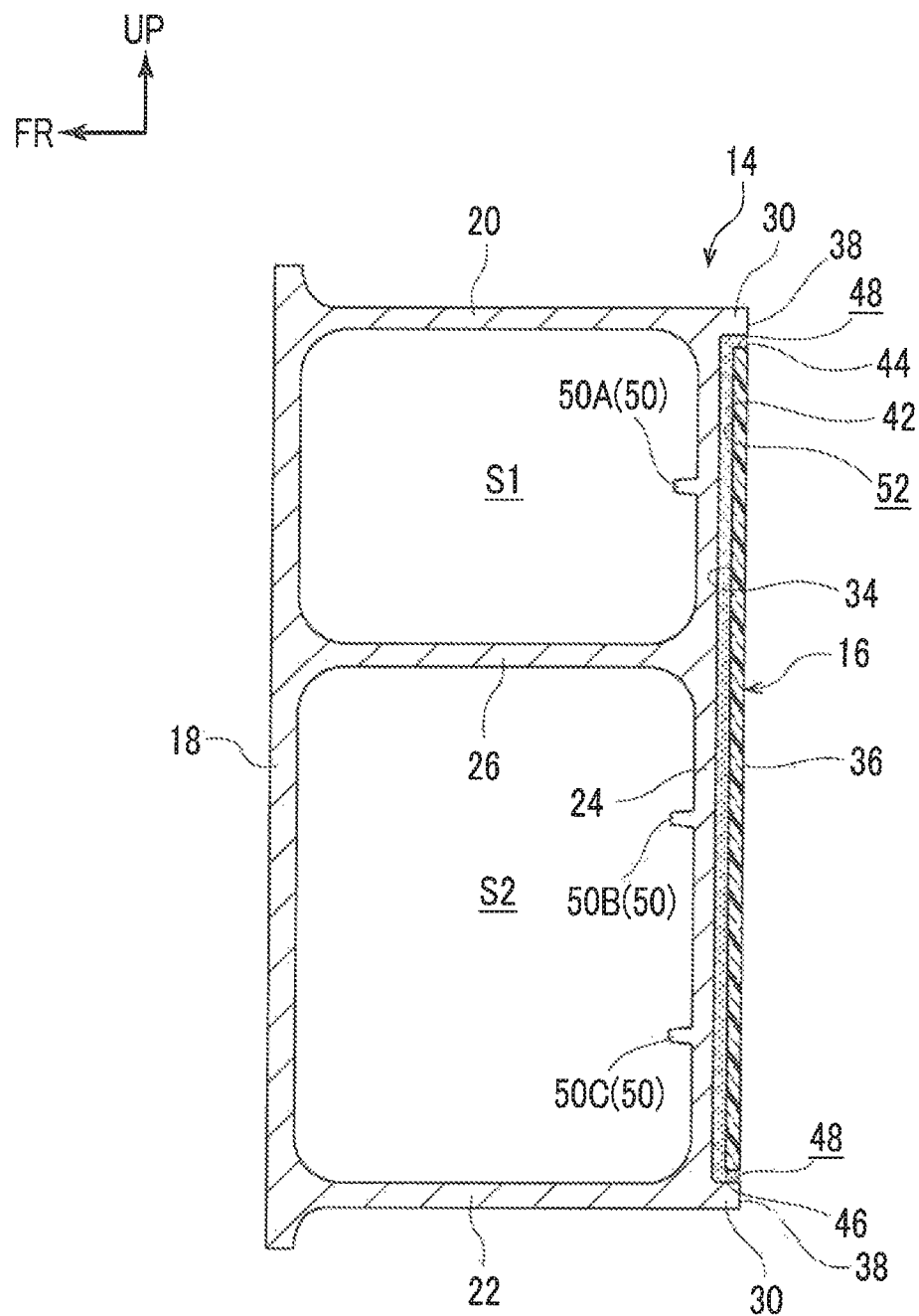
FIG. 5 is an enlarged sectional view illustrating a state where a front bumper reinforcement according to a second embodiment is cut by a plane orthogonal to a longitudinal direction.

In other words, the reinforcing portions 50 are disposed on a rear wall portion 24 of a bumper R/F 14 as illustrated in FIG. 5. Each of the reinforcing portions 50 extends along the longitudinal direction of the bumper R/F 14. Each of the reinforcing portions 50 protrudes to the front side of the vehicle from the rear wall portion 24 along the direction that is perpendicular to the surface of the rear wall portion 24 and in the shape of a projection in side view of the vehicle. The amounts by which the reinforcing portions 50 protrude are set such that the amounts are substantially equal to one another.

The reinforcing portions 50 are separated from one another in the up-down direction of the vehicle. Specifically, the reinforcing portions 50 are disposed inside a pair of end portion reinforcing portions 30 in the up-down direction of the vehicle with the two end portion reinforcing portions 30 formed in respective end portions of the rear wall portion 24 in the up-down direction of the vehicle, and a first reinforcing portion 50A is formed substantially in the middle of the part of the rear wall portion 24 in the up-down direction of the vehicle that corresponds to a closed space S1. A second reinforcing portion 50B and a third reinforcing portion 50C are formed at the part of the rear wall portion 24 that corresponds to a closed space S2. The dimension in the up-down direction of the vehicle from the second reinforcing portion 50B to a middle wall portion 26 and the dimension in the up-down direction of the vehicle from the third reinforcing portion 50C to a lower wall portion 22 in the lower end portion of the rear wall portion 24 are set such that the dimensions are substantially equal to each other.

A first gap 52 is formed between a vehicle front side surface 34 of a reinforcing member 16 and the rear wall portion 24 of the bumper R/F 14. The first gap 52 has a substantially constant dimension in the direction that is perpendicular to the surface of the rear wall portion 24. An adhesive 42 is interposed in the first gap 52. A second gap 48 is formed between an upper end face 44 of the reinforcing member 16 and the upper end portion reinforcing portion 30 of the bumper R/F 14 and another second gap 48 is formed between a lower end portion 46 of the reinforcing member 16 and the lower end portion reinforcing portion 30 of the bumper R/F 14. The second gaps 48 are continuous to the first gap 52 and the second gaps 48 have a substantially constant dimension in the up-down direction of the vehicle. The adhesive 42 is interposed in the second gaps 48 to be continuous to that in the first gap 52.

Action and Effect of Second Embodiment

The action and effect of the present embodiment will be described below.

The configuration of the vehicle body structure according to the second embodiment differs from the configuration of the vehicle body structure according to the first embodiment just in that the reinforcing portions 50 according to the second embodiment protrude toward the front side of the vehicle. Accordingly, effects similar to those achieved with the first embodiment can be achieved with the second embodiment.

By the reinforcing portions 50 protruding to the front side of the vehicle, the reinforcing portions 50 do not affect attachment of the reinforcing member 16 to the rear wall portion 24 (adhesive force of the reinforcing member 16 with respect to the rear wall portion 24 is constant). Accordingly, the amount by which the reinforcing portions 50 protrude and the shape of the reinforcing portions 50 can be appropriately adjusted in accordance with the bending load that is applied to the rear wall portion 24, which is eventually applied to the bumper R/F 14.

Modification Example of Second Embodiment

A vehicle body structure according to a modification example of the second embodiment will be described below.

Figure 6:
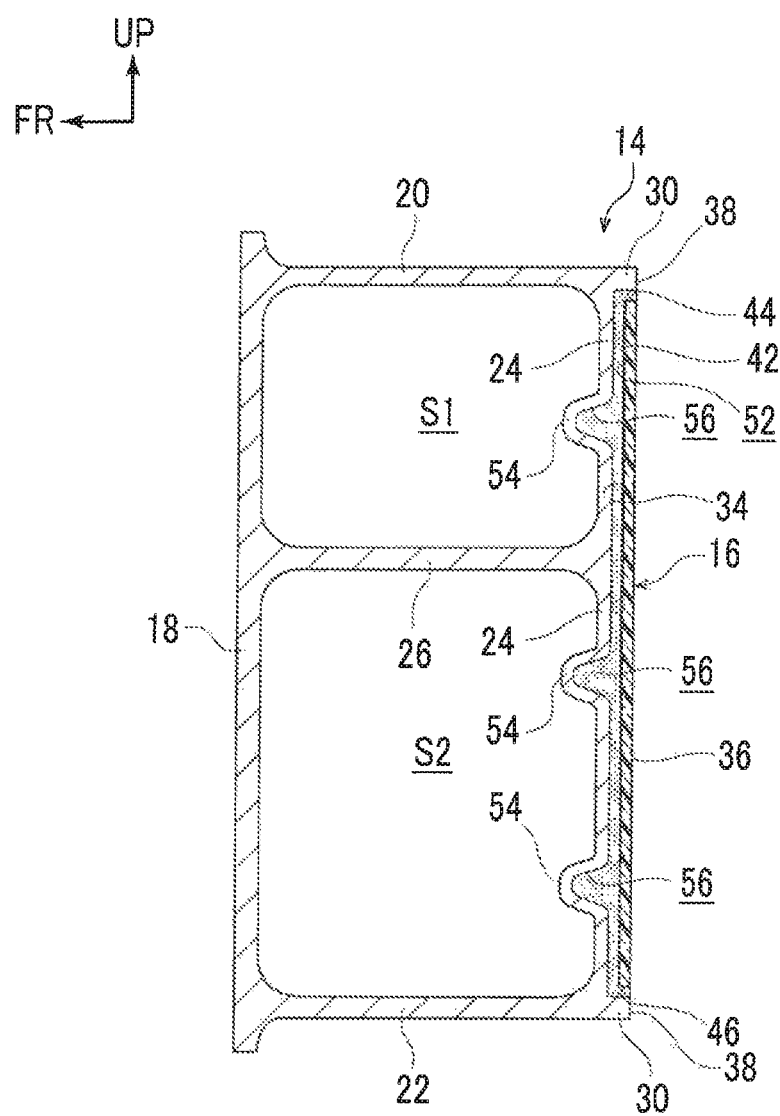
FIG. 6 is an enlarged sectional view illustrating a state where a front bumper reinforcement according to a modification example of the second embodiment is cut by the plane orthogonal to the longitudinal direction.

As illustrated in FIG. 6, a plurality of reinforcing portions 54 is disposed on the rear wall portion 24 of the bumper R/F 14. Each of the reinforcing portions 54 extends along the longitudinal direction of the bumper R/F 14. Each of the reinforcing portions 54 protrudes to the front side of the vehicle from the rear wall portion 24 along the direction that is perpendicular to the surface of the rear wall portion 24 and in a substantially U-shape in side view of the vehicle. Accordingly, a groove 56 is formed in the back of each of the reinforcing portions 54. The adhesive 42 is interposed in the grooves 56 to be continuous to that in the first gap 52. The amounts by which the reinforcing portions 54 protrude are set such that the amounts are substantially equal to one another.

Accordingly, the adhesive 42 in the grooves 56 acts as an anchor, so to speak, in the bumper R/F 14, and thus the adhesive force of the reinforcing member 16 with respect to the rear wall portion 24 can be further improved.

Third Embodiment

Hereinafter, a vehicle body structure according to a third embodiment will be described. The same reference numerals will be used to refer to the components that are basically the same as in the first embodiment, and description thereof will be omitted.

The vehicle body structure according to the third embodiment has the same basic configuration as the vehicle body structure according to the first embodiment. The vehicle body structure according to the third embodiment is characterized by a plurality of reinforcing portions 60 being disposed in the up-down direction of the vehicle as the longitudinal direction of the reinforcing portions 60.

Figure 7:
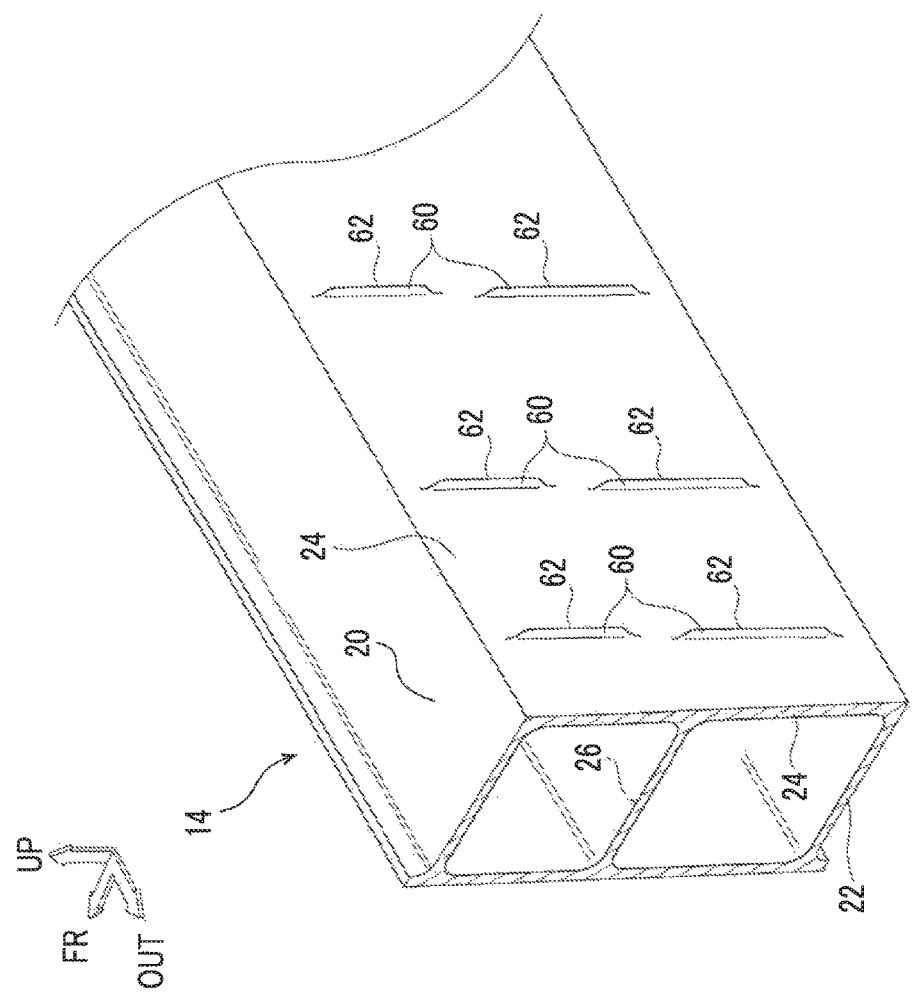
FIG. 7 is a sectional perspective view illustrating a state where a front bumper reinforcement according to a third embodiment is cut by the plane orthogonal to the longitudinal direction.

In other words, the reinforcing portions 60 are disposed in a rear wall portion 24 of a bumper R/F 14 as illustrated in FIG. 7. The reinforcing portions 60 are spaced apart from one another in both the short direction of the bumper R/F 14 (up-down direction of the vehicle) and the longitudinal direction of the bumper R/F 14 (width direction of the vehicle). Each of the reinforcing portions 60 extends along the short direction of the bumper R/F 14 and protrudes to the rear side of the vehicle from the rear wall portion 24 along the direction that is perpendicular to the surface of the rear wall portion 24 and in the shape of a projection in side view of the vehicle. The amounts by which the reinforcing portions 60 protrude are set such that the amounts are substantially equal to one another.

A vehicle front side surface 34 (refer to FIG. 3) of a reinforcing member 16 abuts against top wall portions 62 of the reinforcing portions 60. The reinforcing member 16 and end portion reinforcing portions 30 are not illustrated in FIG. 7 for easy understanding of the reinforcing portions 60. Accordingly, a plurality of first gaps (not illustrated) that has a substantially constant dimension in the direction which is perpendicular to the surface of the rear wall portion 24 is formed between the vehicle front side surface 34 of the reinforcing member 16 and the rear wall portion 24 of the bumper R/F 14, and an adhesive (not illustrated) is interposed in the first gaps.

Action and Effect of Third Embodiment

The action and effect of the present embodiment will be described below.

The configuration of the vehicle body structure according to the third embodiment differs from the configuration of the vehicle body structure according to the first embodiment just in that the reinforcing portions 60 according to the third embodiment are disposed in the up-down direction of the vehicle as the longitudinal direction of the reinforcing portions 60. Accordingly; effects similar to those achieved with the first embodiment can be achieved with the third embodiment.

According to the configuration of the third embodiment described above, the reinforcing portions 60 protrude to the rear side of the vehicle along the direction that is perpendicular to the surface of the rear wall portion 24 and in the shape of a projection in side view of the vehicle. However, the disclosure is not limited thereto. The reinforcing portions 60 may also protrude to the front side of the vehicle along the direction that is perpendicular to the surface of the rear wall portion 24 and in the shape of a projection in side view of the vehicle or may also protrude to the front side of the vehicle along the direction that is perpendicular to the surface of the rear wall portion 24 and in a substantially U-shape (so-called concave bead shape) in side view of the vehicle.

The number of each of the reinforcing portions 28, 50, 54, 60 is not limited to that according to the description of the first to third embodiments. The number of each of the reinforcing portions 28, 50, 54, 60 may also be one or at least four in view of the dimension of the rear wall portion 24 of the bumper R/F 14, the degree of the bending, and so on.

According to the above description, the end portion reinforcing portions 30 are disposed in the rear wall portion 24 of the bumper R/F 14. However, the disclosure is not limited thereto. The end portion reinforcing portions 30 may be omitted as well.

Each of the reinforcing portions 28, 50, 54, 60 has a constant amount of protrusion from the rear wall portion 24. However, the disclosure is not limited thereto. The amount of protrusion may also vary from part to part in the rear wall portion 24.

According to the above description, the reinforcing portions 28, 50, 54, 60, the end portion reinforcing portions 30, and the reinforcing member 16 are disposed in the bumper 14. However, the disclosure is not limited thereto. The reinforcing portions 28, 50, 54, 60, the end portion reinforcing portions 30, and the reinforcing member 16 may also be disposed in another vehicle framework member such as the front side members 12.

According to the above description, the reinforcing portions 28, 50, 54, 60, the end portion reinforcing portions 30, and the reinforcing member 16 are disposed in the rear wall portion 24 of the bumper R/F 14. However, the disclosure is not limited thereto. The reinforcing portions 28, 50, 54, 60, the end portion reinforcing portions 30, and the reinforcing member 16 may also be disposed in the upper wall portion 20, the lower wall portion 22, and the front wall portion 18.

According to the above description, the end portion reinforcing portions 30 are disposed in both end portions of the rear wall portion 24 of the bumper R/F 14 in the up-down direction of the vehicle. However, the disclosure is not limited thereto. The end portion reinforcing portions may also be formed in both end portions of the rear wall portion 24 in the width direction of the vehicle such that the end portion reinforcing portions face both end portions of the reinforcing member 16 in the width direction of the vehicle.

The disclosure is not limited to the embodiments described above. It is a matter of course that the embodiments can be modified in various ways without departing from the gist of the invention.

What is claimed is:

1. A vehicle body structure of a vehicle, the vehicle body structure comprising:
a reinforcing member formed of a fiber reinforced resin and having a plate shape or a sheet shape so that the reinforcing member has a first major surface facing toward a front of the vehicle and a second major surface facing toward a rear of the vehicle, the first and second major surfaces being separated by a thickness of the reinforcing member; and
a metallic vehicle framework member including a rear wall portion and a reinforcing portion, the reinforcing portion (i) being disposed on the rear wall portion, and (ii) protruding in a direction perpendicular to the rear wall portion, wherein
the first major surface of the reinforcing member is bonded to a rear surface of the rear wall portion by an adhesive that fills a gap between the first major surface of the reinforcing member and the rear surface of the rear wall portion.

2. The vehicle body structure according to claim 1, wherein:
the reinforcing portion is disposed on and protrudes from the rear surface of the rear wall portion.

3. The vehicle body structure according to claim 2, wherein:
a plurality of the reinforcing portions is disposed on the rear surface of the rear wall portion and the reinforcing portions have a constant amount of protrusion from the rear surface; and
the adhesive is interposed between the reinforcing portions.

4. The vehicle body structure according to claim 2, wherein:
the vehicle framework member has an end portion reinforcing portion which is disposed on a rear surface of the vehicle framework member and which extends in a thickness direction of the reinforcing member, the end portion reinforcing portion facing at least a part of an edge of the reinforcing member in a direction intersecting the thickness direction of the reinforcing member; and
the adhesive is interposed between the end portion reinforcing portion and the edge of the reinforcing member.

5. The vehicle body structure according to claim 2, wherein:
the vehicle framework member includes a front wall portion, an upper wall portion extending toward the rear of the vehicle from an upper end side of the front wall portion, and a lower wall portion extending toward the rear of the vehicle from a lower end side of the front wall portion; and
the rear wall portion connects a rear end side part of the upper wall portion and a rear end side part of the lower wall portion to each other in an up-down direction of the vehicle.

6. The vehicle body structure according to claim 5, wherein the vehicle framework member further includes a middle wall portion extending in a front-rear direction of the vehicle and connecting an upper section of the front wall portion and an upper section of the rear wall portion to each other, and the upper section of the front wall portion is above a center of the front wall portion in the up-down direction of the vehicle and the upper section of the rear wall portion is above a center of the rear wall portion in the up-down direction of the vehicle.

7. The vehicle body structure according to claim 1, wherein:
the rear wall portion of the vehicle framework member has a front surface being on a side opposite to the rear surface; and
the reinforcing portion is disposed on the front surface of the rear wall portion.

8. The vehicle body structure according to claim 1, wherein the reinforcing portion is a protrusion protruding along a vertical direction from the rear wall portion.

9. The vehicle body structure according to claim 1, wherein the reinforcing member is disposed on an outside of the rear wall portion of the metallic vehicle framework member.

10. The vehicle body structure according to claim 1, wherein the reinforcing portion protrudes from the rear wall portion either toward or away from the reinforcing member so that a first distance between the reinforcing portion and the reinforcing member is different from a second distance between the rear surface of the rear wall portion and the reinforcing member.

11. The vehicle body structure according to claim 10, wherein the reinforcing portion protrudes toward the reinforcing member so that the first distance is less than the second distance, and the reinforcing portion is located between the rear surface of the rear wall portion and the reinforcing member.

12. The vehicle body structure according to claim 10, wherein the reinforcing portion protrudes away from the reinforcing member so that the first distance is greater than the second distance, and the rear surface of the rear wall portion is located between the reinforcing portion and the reinforcing member.

* * * * *